United States Patent
Messinger et al.

(10) Patent No.: US 9,369,377 B2
(45) Date of Patent: Jun. 14, 2016

(54) SYSTEM ANALYZER AND METHOD FOR ANALYZING AN IMPACT OF A CHANGE IN A COMPONENT OF A DISTRIBUTED CONTROL SYSTEM

(71) Applicant: ABB Technology AG, Zürich (CH)

(72) Inventors: Christian Messinger, Hirschberg (DE); Pablo Rodriguez Carrion, Ilvesheim (DE); Georg Gutermuth, Heidelberg (DE); Jan-Christian Schäfer, Mannheim (DE)

(73) Assignee: ABB TECHNOLOGY AG, Zurich (CH)

( * ) Notice: Subject to any disclaimer, the term of this patent is extended or adjusted under 35 U.S.C. 154(b) by 130 days.

(21) Appl. No.: 14/505,858

(22) Filed: Oct. 3, 2014

(65) Prior Publication Data

US 2016/0099863 A1  Apr. 7, 2016

(51) Int. Cl.
*G05B 19/418*  (2006.01)
*H04L 12/24*  (2006.01)
*H04L 12/703*  (2013.01)
*H04L 12/26*  (2006.01)

(52) U.S. Cl.
CPC ............ *H04L 45/28* (2013.01); *G05B 19/4185* (2013.01); *G05B 19/41885* (2013.01); *H04L 41/0659* (2013.01); *H04L 41/147* (2013.01); *H04L 41/20* (2013.01); *H04L 41/22* (2013.01); *H04L 43/045* (2013.01)

(58) Field of Classification Search
None
See application file for complete search history.

(56) References Cited

U.S. PATENT DOCUMENTS 9,009,530 B1 * 4/2015 Chen .................... G06F 11/3676
714/26

OTHER PUBLICATIONS

Michael Berg et al., A Reference Model for Control and Automation Systems in Electric Power, U.S. Department of Energy, Sandia National Laboratories, Dec. 2005, pp. 1-7.
Yi Deng et al., Communication Network Modeling and Simulation for Wide Area Measurement Applications, Proceedings of the $2^{nd}$ IEEE International Conference on Smart Grid Communications (Smart-GridComm), Brussels, Belgium, Oct. 17-20, 2011, pp. 1-6.

* cited by examiner

*Primary Examiner* — Timothy J Weidner
(74) *Attorney, Agent, or Firm* — Buchanan Ingersoll & Rooney PC

(57) ABSTRACT

A system analyzer and a method for analyzing an impact of a change in a component of a distributed control system (DCS) are disclosed. The system can collect and store data representing the DCS components and their interconnection as well as signals of the DCS components. The DCS can be graphically modeled with nodes and directed edges, wherein a node represents either a type of DCS component or a signal of a DCS components, and wherein an edge is an "influence"-edge, or a "contains"-edge. Information on a change of a DCS components is received, a depth first or breadth first search is performed over the "influence"-edges and "contains"-edges and determine unchanged DCS components which would be affected by a malfunction, a removal or a taking out of operation of the at least one DCS component, and information on the affected DCS components is transmitted to an operator interface.

18 Claims, 3 Drawing Sheets

SYSTEM ANALYZER AND METHOD FOR ANALYZING AN IMPACT OF A CHANGE IN A COMPONENT OF A DISTRIBUTED CONTROL SYSTEM

FIELD

The disclosure relates to a system analyzer and a method for analyzing an impact of a change in a component of a distributed control system (DCS). The system analyzer can include a data collecting unit with data storage means for collecting and storing data representing the DCS components and their interconnection, a model generating unit for modeling the DCS, and a model analyzing unit.

BACKGROUND INFORMATION

A distributed control system (DCS) is commonly arranged to control operation of a geographically extensive industrial facility. In addition, it can include one or several superordinate automation servers and data storage units for performing higher level tasks in connection with the managing of the industrial facility, for example central monitoring and supervision as well as life cycle management of the industrial facility's components. The industrial facility can belong to different industry sectors, such as the discrete manufacturing industry, or the power generation industry, or the process industry such as the pharmaceutical, the chemical or the mineral and oil and gas industry. In other words, the industrial facility can for example be a power plant, a substation, a chemical plant or an automated factory.

The DCS commonly includes field devices located close to the actual production process of the industrial facility and, accordingly, being distributed across the industrial facility. Field devices can be those devices which interact directly with the production process, (e.g., actuators, sensors), as well as those devices which directly communicate with the actuators and sensors (e.g., local control devices and local I/O (input/output) modules). The communication is performed via fieldbuses. Further, the DCS includes network devices for enabling the network communication between the field devices and the superordinate automation servers and data storage units, wherein the network devices include switches, routers and gateways.

Because a DCS can include between several hundred to several thousand components which communicate with one another over an extensive communication network, involving multiple network protocols, a considerable effort can be required to ensure seamless and reliable engineering, configuring, securing, commissioning and maintaining of the DCS. Due to the sheer number of components, it is no longer possible to perform these tasks without the help of computerized tools.

An important step during the above tasks can be the analyzing of the interaction between the components of the DCS, wherein the analysis can be performed based on a computerized model of the infrastructure of the communication network or networks, or based on a computerized model of the functional behavior of controllers, actuators and sensors in connection with the physical behavior of the industrial facility.

For example, a computerized model of an automation system of an electric power system is described in "A reference model for control and automation systems in electric power" by Michael Berg and Jason Stamp, published by U.S. Department of Energy, Sandia National Laboratories, December 2005. The model is used for analyzing security issues in the automation system. It is created using object-role modeling, wherein not only single hardware or software components of the automation system, but also sub-systems, groups of data and even personnel can be modeled as objects. The objects can serve as references for features and properties which can be common across all instances of that object within the system. Relationships between the objects can be modeled as roles. The number of roles is not limited. The paper, for example, includes such roles as "monitored by", "sampled by", analyzed by", "aggregates", "calls" and "commanded by". The model proposed in the paper covers several levels of the automation system, starting from the field devices over SCADA components (supervisory control and data acquisition) and the control center, up to so called oversight entities, such as regional transmission operators and business objectives. Nevertheless, the model focuses exclusively on functional aspects of the automation system, without taking into account any communication network infrastructure.

Another example for modeling an automation system is described in "Communication Network Modeling and Simulation for Wide Area Measurement Applications" by Yi Deng et al., Proceedings of the 2nd IEEE International Conference on Smart Grid Communications (Smart-GridComm), Brussels, Belgium, Oct. 17-20, 2011. Here, a simulation model of the communication network of a Wide Area Measurement System (WAMS) is presented which is used for evaluating various communication infrastructure choices. The WAMS network is modeled in OPNET software in a hierarchical way, corresponding to the actual protocol layer, the device layer and the network layer. The WAMS network is modeled by an undirected graph with nodes representing substations—in their capacity as participants of communication over the optical fiber network of the WAMS—as well as a centralized Super Phasor Data Concentrator which is used for processing data uploaded from the substations. Further, the routers of the ring shaped communication backbone network can be each represented by a node. The field equipment of the WAMS, namely Phasor Measurement Units (PMUs), relays and circuit breakers can be represented in OPNET by workstations and servers. In other words, they can be regarded purely under the aspect of their network communication functionality. Based on the WAMS network model, it is then possible to vary communication parameters, such as data bandwidth and communication protocol, and to compare their influence on the performance of the WAMS communication network.

However, with the existing tools, it is not yet possible to quickly analyze the potential impact which a change in a network communication device, such as a switch or router, can have on the interaction of field devices, such as the functionality of a specific control loop, and vice versa. In other words, the interdependency of DCS components belonging to different domains, for example the control domain versus the network communication domain versus the monitoring and supervisory domain, is not yet covered by any of the known computerized tools.

SUMMARY

A system analyzer is disclosed for analyzing an impact of a change in a component of a distributed control system (DCS), the system analyzer comprising: a data collecting unit with data storage means for collecting and storing data representing DCS components and their interconnection; a model generating unit for modeling a DCS; and a model analyzing unit, wherein: the data collecting unit is configured to collect data from at least a network infrastructure tool and from a control logic tool, wherein the collected data includes data on signals which are generated, processed and/or transmitted by DCS components; the model generating unit is configured to model a DCS using a graphic representation with nodes and directed edges, wherein a node represents: either a type of a DCS component, with each type being defined to include at least network switches, routers, network cables, controllers, actuators and sensors; or a signal generated, processed and/or transmitted by a DCS component; and wherein an edge belongs to one of two categories: an "influence"-edge which reflects that a change in a starting node of the "influence"-edge results in a change in an ending node of the "influence"-edge; or a "contains"-edge which reflects that a failure in a starting node of the "contains"-edge results in a failure in an ending node of the "contains"-edge, and a failure in the ending node leads to a partial failure in the starting node; and wherein: the model analyzing unit is configured to: receive information on a change concerning at least one DCS component; perform a depth first or breadth first search over the "influence"-edges and "contains"-edges and determine which of unchanged DCS components would be affected by a malfunction, a removal or a taking out of operation of a DCS component; and transmit information on affected DCS components to an operator interface for display on a screen.

A method is disclosed for analyzing an impact of a change in a component of a distributed control system (DCS), the method comprising: collecting and storing data representing DCS components of the DCS and their interconnection; modeling the DCS; analyzing the DCS model, wherein the data is collected from at least a network infrastructure tool and from a control logic tool, the collected data including data on signals which are generated, processed and/or transmitted by the DCS components, wherein: the DCS is modeled using a graphic representation with nodes and directed edges, wherein a node represents: either a type of a respective one of the DCS components, with types being defined to include at least network switches, routers, network cables, controllers, actuators and sensors; and/or a signal generated, processed and/or transmitted by a respective one of the DCS components; and wherein: an edge belongs to one of two categories: an "influence"-edge which reflects that a change in a starting node of the "influence"-edge results in a change in an ending node of the "influence"-edge; or a "contains"-edge which reflects that a failure in a starting node of the "contains"-edge results in a failure in an ending node of the "contains"-edge, and a failure in the ending node leads to a partial failure in the starting node; the method including: receiving information on a change concerning at least one of the DCS components; performing a depth first or breadth first search over the "influence"-edges and "contains"-edges and determining which of any unchanged DCS components would be affected by a malfunction, a removal or a taking out of operation of the at least one DCS component; and transmitting information on any affected DCS components to an operator interface for display on a screen.

BRIEF DESCRIPTION OF THE DRAWINGS

Features of the disclosure and exemplary embodiments will become even more apparent from the examplary embodiments described herein in connection with the appended drawings wherein.

DETAILED DESCRIPTION

Figure 1:
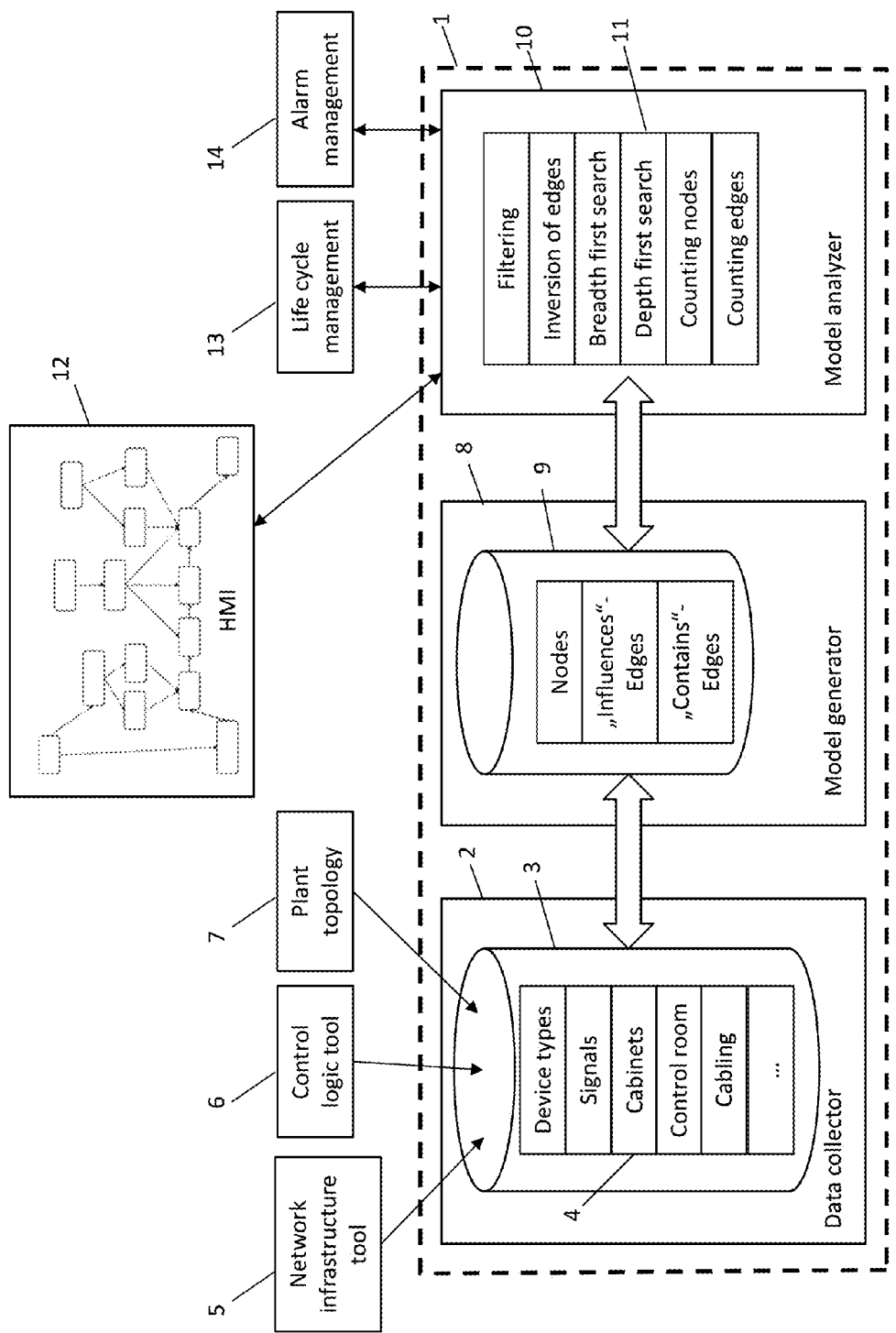
FIG. 1 shows an exemplary system analyzer and its interaction with external systems according to an exemplary embodiment of the disclosure.

A solution is disclosed for analyzing how a change in a component of a DCS potentially affects the other DCS components, independently of the domain to which the DCS components belong.

In a system analyzer, the data collecting unit can be arranged to collect the data from at least a network infrastructure tool and from a control logic tool, further including data on signals which can be generated, processed and/or transmitted by the DCS components. Further, the model generating unit can be arranged to model the DCS using a graphic representation with nodes and directed edges.

A node of the graph represents either a type of a respective one of the DCS components, with the types being defined to include at least network switches, routers, network cables, controllers, actuators and sensors, or a signal generated, processed and/or transmitted by a respective one of the DCS components. Accordingly, the signals which can be represented in the graph by nodes can either be electrical signals, or communication signals transmitted over a network cable from one DCS component to the next, or internal signals generated and processed only internally in a DCS component without being transmitted anywhere.

The edges in the graph can belong to one of two categories; they can be either an "influence"-edge which reflects that a change in a starting node of the "influence"-edge results in a change in an ending node of the "influence"-edge; or a "contains"-edge which reflects that a failure in a starting node of the "contains"-edge results in a failure in an ending node of the "contains"-edge and a failure in the ending node leads to a partial failure in the starting node.

According to exemplary embodiments of the disclosure, the model analyzing unit can be arranged to receive information on a change concerning at least one of the DCS components, where this information can for example be received from an alarm management unit or a life cycle management unit, in the form of an alarm or a service request, or from a hardware configuration unit which is used to configure the at least one of the DCS components. The alarm management unit and the life cycle management unit can both monitor the operation of the DCS, and in the case of an alarm or an expected end-of-life situation of one of the DCS components, they can—as a reaction thereto—automatically generate either a warning or an action item in the form of a hardware change request. The hardware change request can also come from an operator interface, during engineering, commissioning or maintaining of the DCS. For example, a change in at least one of the DCS components can mean any of a malfunction, a taking out of operation, a removal, an exchange, or an insertion with respect to the existing DCS.

The model analyzing unit can be further arranged to perform a depth first or breadth first search over the "influence"-edges and "contains"-edges and to determine which of the unchanged DCS components would be affected by a removal of the at least one DCS component. The result, (i.e., the information on the affected DCS components) is then transmitted by the model analyzing unit to an operator interface to be displayed on a screen.

A basic idea behind exemplary embodiments of the present disclosure is to regard all DCS components from the perspective of signal generation, signal processing and/or signal transmission. In other words, for each DCS component, it is determined whether the component generates or processes or transmits a signal, and this is reflected in the directed graph representation with the "influences"- and the "contains"-graphs. Due to the introduction of the directed edges, it now becomes possible to perform searches through the model, which allow for new ways of analyzing the DCS. The aspect of obtaining a searchable model has not been included in known tools.

As a result, it now becomes possible to investigate which one of the DCS components of the DCS would be affected by a malfunction, a removal or a taking out of order of one of them. In this way, it can for example be decided whether and how maintenance work at the one DCS component can be executed while keeping the DCS running, or whether a redundancy scheme is fail-safe or not. With the disclosed exemplary modeling of the DCS with a graph containing just nodes and only the two types of edges, "influences"-edges and "contains"-edges, it is possible to create a model representation of all operational dependencies within the DCS, independently of the domain to which the respective DCS component belongs. Accordingly, it can for example be investigated how a change in the network domain affects the control domain, e.g., which field devices would be affected if a cable 200 km away was broken, or which communication signals would no longer be transferred to a distant controller if a temporary maintenance shutdown is required of some of the DCS components at a local end.

Exemplary methods according to the disclosure can cover all functional steps performed by the system analyzer. According to the disclosure, an exemplary method can include steps whereby the data is collected from at least a network infrastructure tool and from a control logic tool, further including data on signals which can be generated, processed and/or transmitted by the DCS components, the DCS being modeled using a graph representation with nodes and directed edges, wherein a node represents either a type of a respective one of the DCS components, with the types being defined to include at least network switches, routers, network cables, controllers, actuators and sensors, and/or a signal generated, processed and/or transmitted by a respective one of the DCS components, and an edge belongs to one of two categories, "influence"-edge which reflects that a change in a starting node of the "influence"-edge results in a change in an ending node of the "influence"-edge; or "contains"-edge which reflects that a failure in a starting node of the "contains"-edge results in a failure in an ending node of the "contains"-edge and a failure in the ending node leads to a partial failure in the starting node, an information on a change concerning at least one of the DCS components is received, a depth first or breadth first search is performed over the "influence"-edges and "contains"-edges and it is determined which of the unchanged DCS components would be affected by a malfunction, a removal or a taking out of operation of the at least one DCS component, and information on the affected DCS components is transmitted to an operator interface to be displayed on a screen.

In a first exemplary embodiment of the system analyzer, the model analyzing unit can be arranged to receive information on an error which occurred in one of the DCS components, to perform a depth first or breadth first search with inverted edges to find a DCS component which is a cause of the error and to transmit information on the error causing DCS component to the operator interface to be displayed on the screen. Accordingly, the search can be performed within the graph in the opposite direction, along inverted edges, in order not to find which further DCS components can be affected by the error but to find one or several causes for the error.

In another exemplary embodiment, the model analyzing unit can be arranged to further receive a query for analyzing a functional independence of nodes, to reduce the number of nodes to be searched by filtering out those nodes which need not be regarded for the respective query depending on their type, and to perform a breadth first search over all edges and over the reduced number of nodes.

In another exemplary embodiment, the model analyzing unit can be arranged to further analyze the DCS by counting the number of nodes of a certain type or by counting the number of signals connected over a certain node type. In this way, certain other features of the DCS can be analyzed. For example, it can be determined what network equipment is considered the most vital for the network communication, by taking the number of signals connected over the switches into account, or where to expect spots of expected heavy network load etc.

In an exemplary embodiment, the model generating unit is arranged to further include in the graph a type of nodes which represents a function performed by a respective one of the DCS components; e.g., an application or a function block executed by a processing unit integrated in a respective one of the DCS components. In this way, the dependencies within the DCS can be modeled additionally on a software level so that the effect of a change in a software function can be taken into account during the already described different analyses.

FIG. 1 shows an exemplary system analyzer 1 including a data collecting unit 2 with data storage means 3 (e.g., a memory device) for collecting and storing data 4 representing components of a DCS and their interconnection as well as signals which can be generated, processed and/or transmitted by the DCS components. DCS components can be of different types, for example actuators, sensors, controllers, I/O modules, network switches, routers, cabinets and control rooms, servers and data storage devices. In an exemplary embodiment they can also include software applications executed by a data processing unit included in any of the hardware components of the DCS. The term "interconnection" includes, for example, any kind of cable and network bus which allows for a signal communication between the hardware components and for the electrical power supply to the hardware components, as well as any internal signal link in a data processing unit of hardware components of the DCS. The signals can include, for example, electrical signals, or communication signals transmitted over a network cable from one hardware component to the next, or internal signals generated and processed only internally in a hardware component without being transmitted anywhere.

The data stored in data storage means 3 can be collected by data collecting unit 2 from different computer tools which belong to different technical domains. The tools can for example be a network infrastructure tool 5 for engineering the communication network of the DCS, a control logic tool 6 for designing and testing the control loops of the DCS, or a plant topology tool 7 for planning the installation of the DCS with respect to the plant location, buildings and rooms.

System analyzer 1 can include a model generating unit 8 for modeling the DCS. The model generating unit 8 can be arranged to model the DCS using a graph representation 20 (see FIG. 2) with nodes 21, 24, 25, 26 and directed edges 22, 23, wherein a node represents for example either the type of a respective one of the DCS components or a signal generated, processed and/or transmitted by a respective one of the DCS components.

An edge can belong to one of two categories. The first category can be "influence"-edges 23 which can be depicted in FIG. 2 by an arrow with a continuous line and which reflect that a change in a starting node 25 of the "influence"-edge results in a change in an ending node 26 of the "influence"-edge. For example, a change in sensor "Temperature 1" would result in a change of "signal A". The second category are "contains"-edges 22 which can be depicted in FIG. 2 by an arrow with a dotted line and which reflect that a failure in a starting node 21 of the "contains"-edge results in a failure in an ending node 24 of the "contains"-edge, and a failure in the ending node leads to a partial failure in the starting node. For example, a broken "cable 3" would result in a partial defect of "switch 2" and a faulty "switch 2" would lead to a malfunction on "cable 3". The nodes and edges can be stored in a data storage unit 9.

Figure 2:
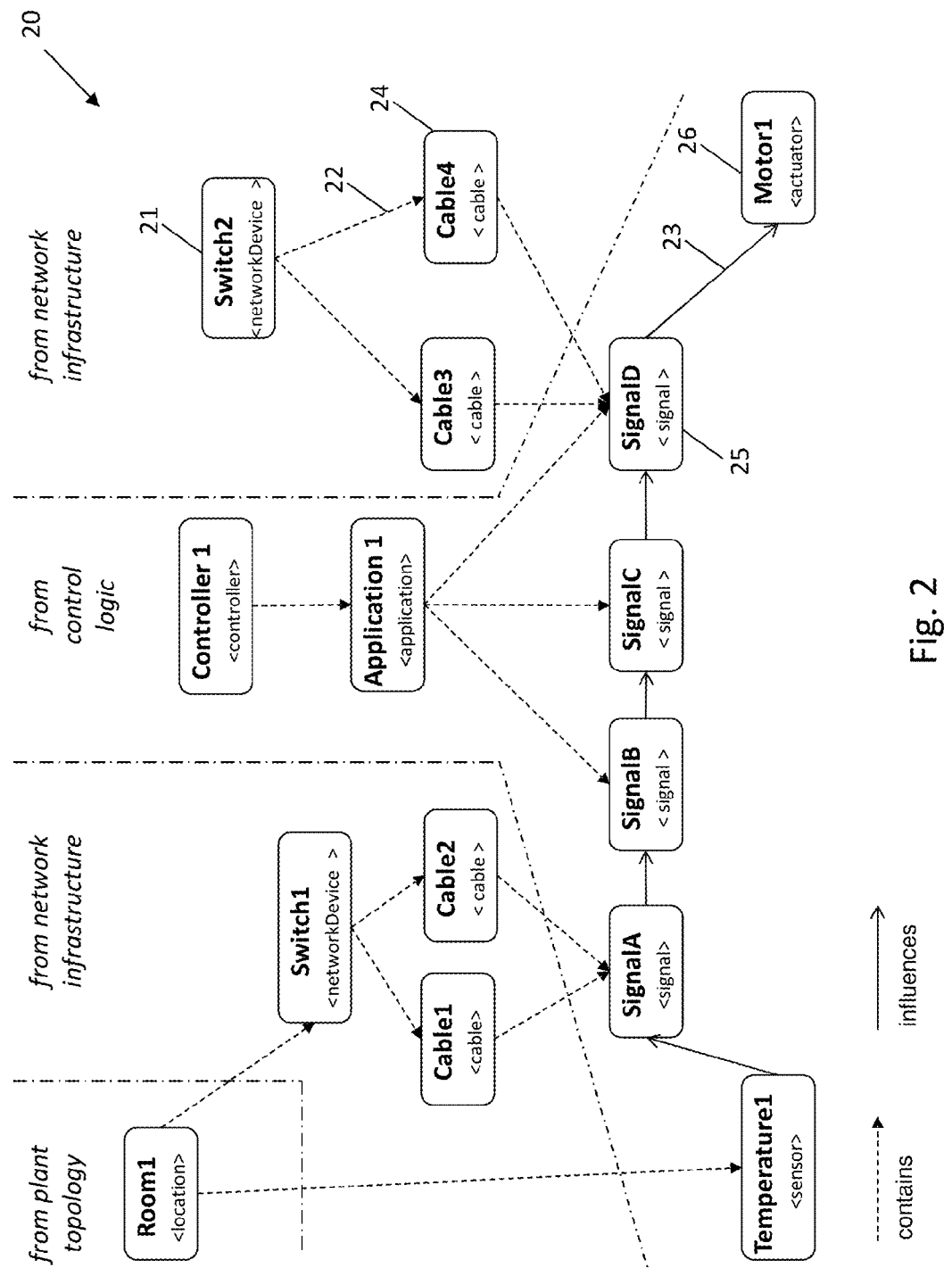
FIG. 2 shows an examplary graph generated by the model generating unit of the system analyzer of FIG. 1 according to an exemplary embodiment of the disclosure.

The type of the nodes and the category of the edges can be attached to them, respectively, by meta-data. Further meta-data can be attached as well. The attached meta-data can enable the model analyzing unit to filter out signals or certain types of DCS components (see below). In FIG. 2, the node-types can for example be written inside of angular brackets; e.g. "<sensor>", "<cable>" or "<signal>".

In a more extensive list of possible node-types, the following exemplary types could be defined:
signals, including variables
field devices, including actuators and sensors,
intelligent field devices, such as field controllers
junction boxes and/or marshaling cabinets
communication devices, e.g. HSE (High Speed Ethernet) link
higher level controller
signal servers
switches, routers (incl. WLAN)
HMI (human-machine interface) faceplates, operator screens, operator stations
locations, e.g. rooms and buildings
alarm lists
cable
virtual devices (controllers, sensors, etc.)
function blocks and applications executed by above devices.

Edges between the nodes can be generated by the model generating unit based on the data received from the various tools. In FIG. 2, it is indicated which nodes and edges come from which tool 5, 6, 7 of FIG. 1. Possible examples of tool-based data sets are given below, together with the type of edges which can be derived from them given in square brackets:
control code [influences/contains], derived by static analysis of the code;
network topology [influences/contains], derived by connecting the network with the signals;
location structures [contains],
hardware integration [influences];
HMI configurations [influences];
alarm management [influences];
hardware structure [contains];
cloud automation [contains].

The graph generated by the model generating unit 8 can model—in other words—the signal-flow and hierarchies in the DCS by using the two directed relationships. For example, the "influences" relationship expresses that a node A influences a node B if and only if a change of A can result in a change of B. This includes the derived meaning that if A is in error, B is also in error. The "influences" relationship can be transitive; i.e., if A influences B and B influences C then A influences C. In FIG. 2, this means for example that if sensor "temperature 1" is faulty, actuator "motor 1" cannot function properly as well. The case where A influences B and B influences A is explicitly possible as well.

The "contains" relationship can for example require the following: node A contains B if B depends on A in a way that a failure in A leads to a failure in B, and B is a part of A so that a failure in B leads to a partial failure in A in the sense that "something in A is broken". The "contains" relationship can form a directed acyclic graph; e.g., a node can be contained in several parents but it can never "contain" a parent of itself. Examples for "contains" relationships are:
A controller contains function blocks which contain signals.
A network-switch contains cables, cables contain signals.
A WLAN router contains signals.

The examples show that "contains" in this context is not necessarily a physical "contains".

The exemplary system analyzer 1 can include a model analyzing unit 10 which is arranged to receive information on a change concerning at least one of the DCS components, perform a depth first or breadth first search over the "influence"-edges and "contains"-edges, and determine which of the unchanged DCS components would be affected by a malfunction, a removal or a taking out of operation of the at least one DCS component, and transmit information on the affected DCS components to an operator interface 12 to be displayed on a screen. Apart from the depth first or breadth first searches, the model analyzing unit 10 can be configured and arranged to perform further processing of the graph, for example by filtering out specific node types, or by inverting edges, or by counting the number of nodes of a certain types or of edges starting or ending at a certain node or node type. Depending on a query initialized by an external DCS operation management system, for example a life cycle management system 13 or an alarm management system 14, or by a human operator via HMI 12, the model analyzing unit 10 can find and apply an appropriate way of processing the graph in order to generate a corresponding analysis result which is then output on the screen of HMI 12 and/or transmitted to the respective system 12 or 13.

Examples of possible queries are explained below.

As already described, the model analyzing unit 10 can be configured and primarily arranged to analyze which nodes can be influenced by a change in a given node. To this end, a depth first or breadth first search over "influence"-edges and "contains"-edges can for example be performed so that risks can be evaluated before a sensor, actuator or other DCS component is changed. This type of analysis can also be used to find failure propagation in the DCS; e.g., to determine which DCS components and signals would be affected by a malfunction of a specific node, or to simply navigate on a screen through the visualized graph representation of the DCS (see FIG. 3). The differences before and after a change in the DCS can be determined by model analyzing unit 10 and can be transmitted to HMI 12 for visualization or to other systems for further processing, such as to life cycle management system 13 or alarm management system 14.

Another possible query could be to analyze which nodes influence a given node or what could be the origin of an error having manifested itself in one of the DCS components. The model analyzing unit 10 could then apply a depth first or breadth first search but with inverted edges, in order to find the error causes in the DCS. The same approach could be used when wanting to navigate through the system to get a context of a specific signal.

Another exemplary query can require analyzing whether a set of nodes, such as a group of sensors or actuators, is independent of other nodes. In response to this query, the model analyzing unit could perform a breadth first search using all edges, but filtering out all nodes that are not in the focus of this specific analysis. For example, if the network infrastructure and control logic is to be analyzed, the topology or location related nodes are not of interest and can be filtered out. Such queries can for example help to prove the independence of safety systems, or to reduce the search space for error detection.

The graph model of the DCS can in addition be used for further exemplary queries in order to analyze the setup or architecture of the DCS under such aspects as finding what is considered to be the most important network equipment by for example taking the number of signals connected over network switches into account, or finding those parts of the DCS where network traffic or network load is particularly heavy or particularly light, or checking whether an implemented redundancy scheme would work sufficiently or whether there would be a single point of failure.

As already mentioned, apart from the node type, additional markers or properties could be added to the nodes, so that even more specific searches could be executed. For example, all safety related nodes, such as controllers, I/O modules, function blocks, could be marked as "safety", so that a query asking for a visualization of the complete safety network structure could be responded to by the model analyzing unit 10.

Figure 3:
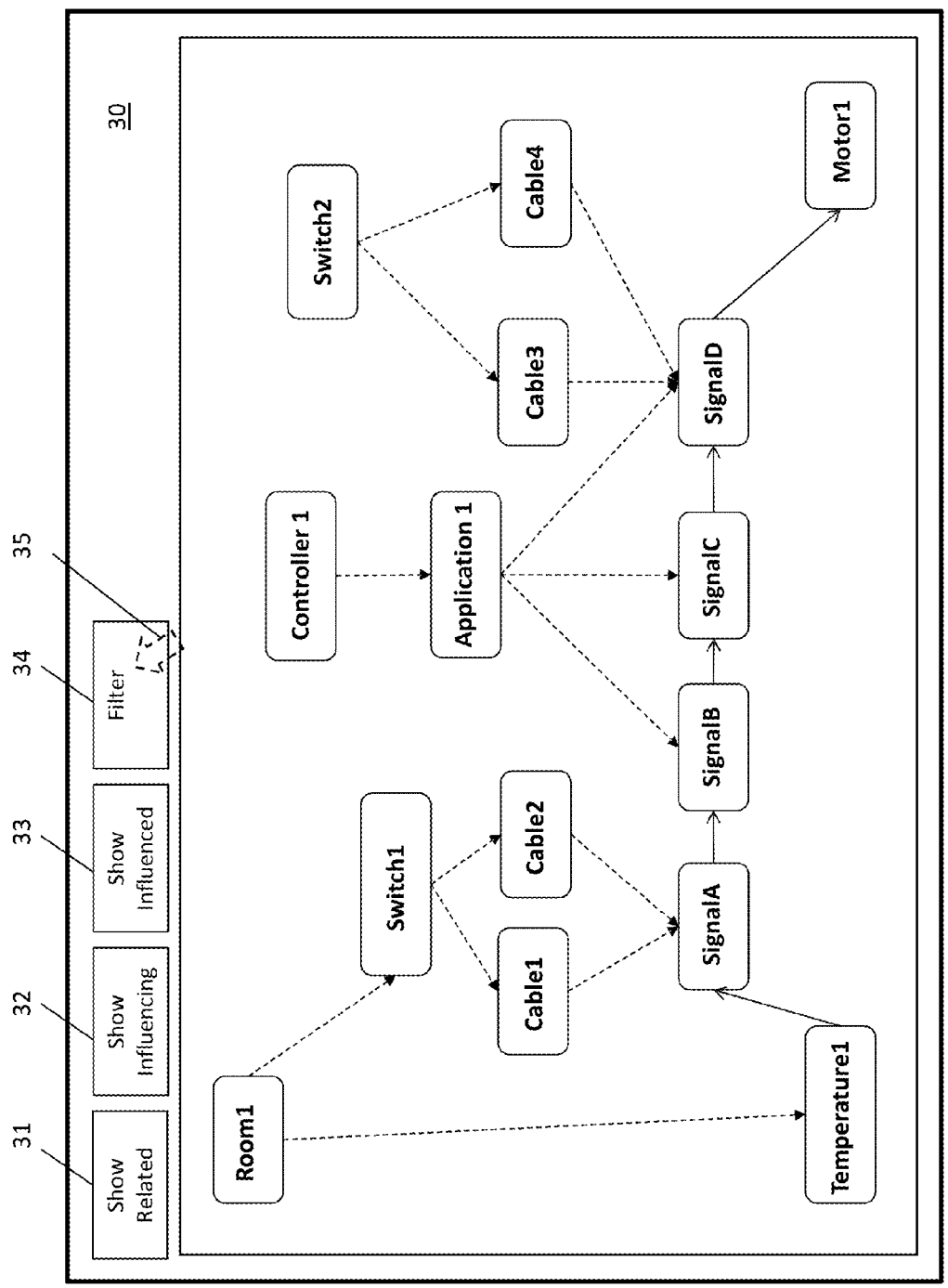
FIG. 3 shows an example of a visualization of the graph and of the analyzing functions to be provided by the system analyzer according to an exemplary embodiment of the disclosure.

As can be seen in FIG. 3, the graph model of the DCS can be visualized via HMI 12 on a screen 30, and the possible queries to analyze the DCS can be started by an operator via corresponding menu entries 31, 32, 33, 34, which can be selected via a mouse pointer 35 for example.

For a larger DCS than shown in FIG. 3, the number of nodes which can be visualized on screen 30 can be reduced by using the transitivity that "A influences B influences C" means also that "A influences C". As a result, the view can be collapsed by, for example, not showing node B. Further, depending on a query, only those connections can for example be shown which lead to a predecessor or successor of a special type (e.g., limited to specified important alarms or selected device types), or only independent sub-graphs can be visualized.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system analyzer for analyzing an impact of a change in a component of a distributed control system (DCS), the system analyzer comprising:
   a data collecting unit with data storage means for collecting and storing data representing DCS components and their interconnection;
   a model generating unit for modeling a DCS; and
   a model analyzing unit, wherein:
   the data collecting unit is configured to collect the data from at least a network infrastructure tool and from a control logic tool, wherein the collected data includes data on signals which are generated, processed, and/or transmitted by DCS components;
   the model generating unit is configured to model a DCS using a graphic representation with nodes and directed edges, wherein a node represents:
   either a type of a DCS component, with each type being defined to include at least network switches, routers, network cables, controllers, actuators and sensors;
   or a signal generated, processed and/or transmitted by a DCS component; and wherein:
   an edge belongs to one of two categories:
   an "influence"-edge which reflects that a change in a starting node of the "influence"-edge results in a change in an ending node of the "influence"-edge; or
   a "contains"-edge which reflects that a failure in a starting node of the "contains"-edge results in a failure in an ending node of the "contains"-edge, and a failure in the ending node leads to a partial failure in the starting node; and wherein the model analyzing unit is configured to:
   receive information on a change concerning at least one DCS component;
   perform a depth first or breadth first search over the "influence"-edges and "contains"-edges and determine which of unchanged DCS components would be affected by a malfunction, a removal or a taking out of operation of a DCS component; and
   transmit information on affected DCS components to an operator interface for display on a screen.

2. The system analyzer according to claim 1, wherein the model analyzing unit is configured to:
   receive information on an error which occurred in a DCS component;
   perform a depth first or breadth first search with inverted edges to find a DCS component which is a cause of the error; and
   transmit information on the error-causing DCS component to the operator interface for display on the screen.

3. The system analyzer according to claim 1, wherein the model analyzing unit is configured to:
   receive a query for analyzing a functional independence of nodes;
   reduce a number of the nodes to be searched by filtering out those nodes which need not be regarded for the query depending on their type; and
   perform a breadth first search over all edges and over a reduced number of the nodes.

4. The system analyzer according to claim 1, wherein the model analyzing unit is configured to:
   analyze a DCS by counting a number of nodes of a certain type or by counting a number of signals connected over a certain node type.

5. The system analyzer according to claim 1, wherein the model generating unit is configured to include in the graph a type of nodes which represents a function performed by a respective DCS component.

6. A method for analyzing an impact of a change in a component of a distributed control system (DCS), the method comprising:
   collecting and storing data representing DCS components of the DCS and their interconnection;
   modeling the DCS;
   analyzing the DCS model, wherein the data is collected from at least a network infrastructure tool and from a control logic tool, the collected data including data on signals which are generated, processed and/or transmitted by the DCS components; wherein:
   the DCS is modeled using a graphic representation with nodes and directed edges, wherein a node represents:

either a type of a respective one of the DCS components, with types being defined to include at least network switches, routers, network cables, controllers, actuators and sensors; and/or a signal generated, processed and/or transmitted by a respective one of the DCS components; and wherein:

an edge belongs to one of two categories:

an "influence"-edge which reflects that a change in a starting node of the "influence"-edge results in a change in an ending node of the "influence"-edge; or a "contains"-edge which reflects that a failure in a starting node of the "contains"-edge results in a failure in an ending node of the "contains"-edge, and a failure in the ending node leads to a partial failure in the starting node, the method including:

receiving information on a change concerning at least one of the DCS components;

performing a depth first or breadth first search over the "influence"-edges and "contains"-edges and determining which of any unchanged DCS components would be affected by a malfunction, a removal or a taking out of operation of the at least one DCS component; and transmitting information on any affected DCS components to an operator interface for display on a screen.

7. The method according to claim 6, comprising:

receiving information on an error which occurred in one of the DCS components;

performing a depth first or breadth first search with inverted edges to find a DCS component which is a cause of the error; and transmitting information on the error causing DCS component to the operator interface for display on the screen.

8. The method according to claim 6, comprising:

receiving a query for analyzing a functional independence of nodes;

reducing the number of nodes to be searched by filtering out those nodes which need not be regarded for the query depending on their type; and performing a breadth first search over all edges and over the reduced number of nodes.

9. The method according to claim 6, comprising:

analyzing the DCS by counting a number of nodes of a certain type, or by counting a number of signals connected over a certain node type.

10. The method according to claim 6, wherein a type of nodes is included in the graphic representation, which type of nodes represents a function performed by a respective one of the DCS components.

11. The system analyzer according to claim 1, in combination with a distributed control system (DCS), for analyzing an impact of a change in a component of the DCS, the data storage means of the data collection unit collecting and storing data representing DCS components of the DCS and their interconnection.

12. The system analyzer according to claim 2, wherein the model analyzing unit is configured to:

receive a query for analyzing a functional independence of nodes;

reduce a number of the nodes to be searched by filtering out those nodes which need not be regarded for the query depending on their type; and perform a breadth first search over all edges and over a reduced number of the nodes.

13. The system analyzer according to claim 12, wherein the model analyzing unit is configured to:

analyze a DCS by counting a number of nodes of a certain type or by counting a number of signals connected over a certain node type.

14. The system analyzer according to claim 13, wherein the model generating unit is configured to include in the graph a type of nodes which represents a function performed by a respective DCS component.

15. The system analyzer according to claim 14, in combination with a distributed control system (DCS), for analyzing an impact of a change in a component of the DCS, the data storage means of the data collection unit collecting and storing data representing DCS components of the DCS and their interconnection.

16. The method according to claim 7, comprising:

receiving a query for analyzing a functional independence of nodes;

reducing the number of nodes to be searched by filtering out those nodes which need not be regarded for the query depending on their type; and performing a breadth first search over all edges and over the reduced number of nodes.

17. The method according to claim 16, comprising:

analyzing the DCS by counting a number of nodes of a certain type, or by counting a number of signals connected over a certain node type.

18. The method according to claim 17, wherein a type of nodes is included in the graphic representation, which type of nodes represents a function performed by a respective one of the DCS components.

* * * * *